Figure 1:
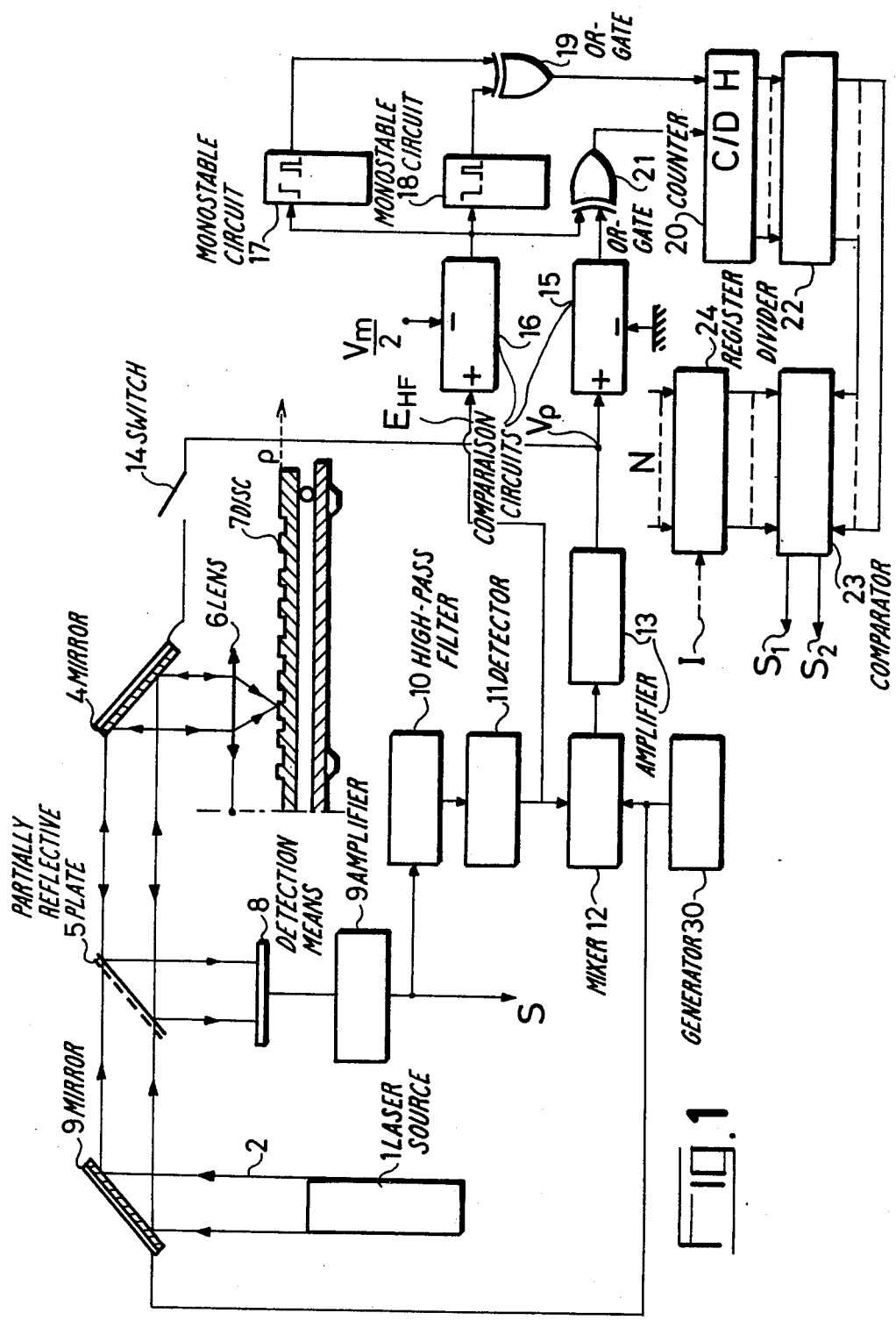

United States Patent [19]

Lehureau et al.

[11] 4,138,663
[45] Feb. 6, 1979

[54] OPTICAL READER FOR INFORMATION DISCS EQUIPPED WITH MEANS FOR AUTOMATIC ACCESS TO THE INFORMATION

[75] Inventors: Jean-Claude Lehureau; Pierre Oprandi, both of Paris, France

[73] Assignee: Thomson-Brandt, Paris, France

[21] Appl. No.: 919,552

[22] Filed: Jun. 27, 1978

[30] Foreign Application Priority Data

Jul. 1, 1977 [FR] France .................. 77 20373

[51] Int. Cl.$^2$ ............................ G11B 7/00
[52] U.S. Cl. ................. 340/146.3 F; 179/100.4 D; 358/128; 360/72; 365/215; 365/234
[58] Field of Search .............. 365/215, 234, 230, 233, 365/236; 358/128; 360/77, 78, 72; 179/100.4 D, 100.4 E; 274/15 R; 340/146.3 F

[56] References Cited

U.S. PATENT DOCUMENTS

| | | | |
|---|---|---|---|
| 3,962,688 | 6/1976 | Westerberg | 365/234 |
| 4,059,841 | 11/1977 | Bricot et al. | 358/128 |
| 4,063,287 | 12/1977 | Van Rosmalen | 358/128 |
| 4,067,044 | 1/1978 | Maeda et al. | 358/128 |
| 4,074,312 | 2/1978 | Van Rosmalen | 358/128 |
| 4,093,832 | 6/1978 | Isaacson et al. | 274/15 R |
| 4,094,010 | 6/1978 | Pepperl et al. | 365/215 |
| 4,094,013 | 6/1978 | Hill et al. | 365/215 |

*Primary Examiner*—Leo H. Boudreau
*Attorney, Agent, or Firm*—Cushman, Darby & Cushman

[57] ABSTRACT

The optical reader, for information discs of which the items of information are locatable by addresses previously recorded on each of the grooves forming the track, comprises a device for counting the number of grooves traversed during search phases which simultaneously uses the envelope of the reading signal and the signal representing the radial error in the position of the head relative to the nearest track, for algebraically counting the number of tracks traversed. After comparison with the number of grooves to be traversed, the counting device controls the deceleration of the radial advance when the spot is at a predetermined distance from the groove to be reached and also its total stoppage and the closure of the radial servocontrol loop when the groove is reached.

7 Claims, 4 Drawing Figures

OPTICAL READER FOR INFORMATION DISCS EQUIPPED WITH MEANS FOR AUTOMATIC ACCESS TO THE INFORMATION

This invention relates to the optical reading of information-carrying discs on which the information has been recorded, along a succession of grooves forming a track, in the form of microelements capable of having one or the other of two optically discernible states.

More particularly, the invention relates to an optical reader for information discs comprising means for automatic access to the information, the bits of information being locatable on the disc by the address of the groove on which they have been recorded. The number of bits of information capable of being recorded on one and the same video disc is very important; several tens of thousands of successive grooves form the track and the location of one bit of information has to be possible without the optical reading of all the preceding bits of information. In one known arrangement, the disc is radially traversed by the reading spot, a device for counting the number of grooves traversed being used for prepositioning the optical reading head in the vicinity of the groove carrying the information to be read.

In this arrangement, the number of grooves traversed is counted by the detection of series of high-frequency (HF) waves which are detected when the reading head passes through the vertical of a groove. An arrangement such as this does not allow for the eccentricity of the disc in relation to the reader and this eccentricity results in an unwaranted overestimation of the number of grooves traversed, a number of them being taken into account several times before the rapid radial advance motor of the optical reading head has reached a sufficient speed. Similarly, during deceleration of the radial advance motor on approaching the desired groove, the reading head cannot be exactly positioned. It is then necessary to make a fine search during which the position of the optical reading head is servocontrolled in such a way that the spot follows the track until the required groove is reached. This fine search phase can last several seconds.

According to the invention, there is provided an optical reader for information disc, said disc being recorded along a track with informations locatable by their addresses recorded on successive grooves of the track, said optical reader comprising a radiation source, a reading head for projection on said disc an optical reading spot, detecting means for detecting the radiation emerging from said disc and delivering a reading signal and an error signal characteristic of amplitude and direction of the radial difference between the position of the reading spot and the position of the nearest groove of said track from said spot, means for automatic access to the information, said means comprising a radial advance mechanism to control relative radial movement of the optical reading head and the disc, an up and down counting device for counting the grooves traversed during said radial movement, said counting device receiving simultaneously said reading signal and said radial error signal, and a comparison circuit receiving the content of said up and down counting device and a predetermined value corresponding to the position of the required information, said comparison circuit being connected to said radial advance mechanism and delivering a control signal to control actuating and stopping of said advance mechanism.

For a better understanding of the invention and to show how the same may be carried into effet, reference will be made to the following description and the attached drawings among which:

FIG. 1 diagrammatically illustrates the optical reader according to the invention.

Figure 2:
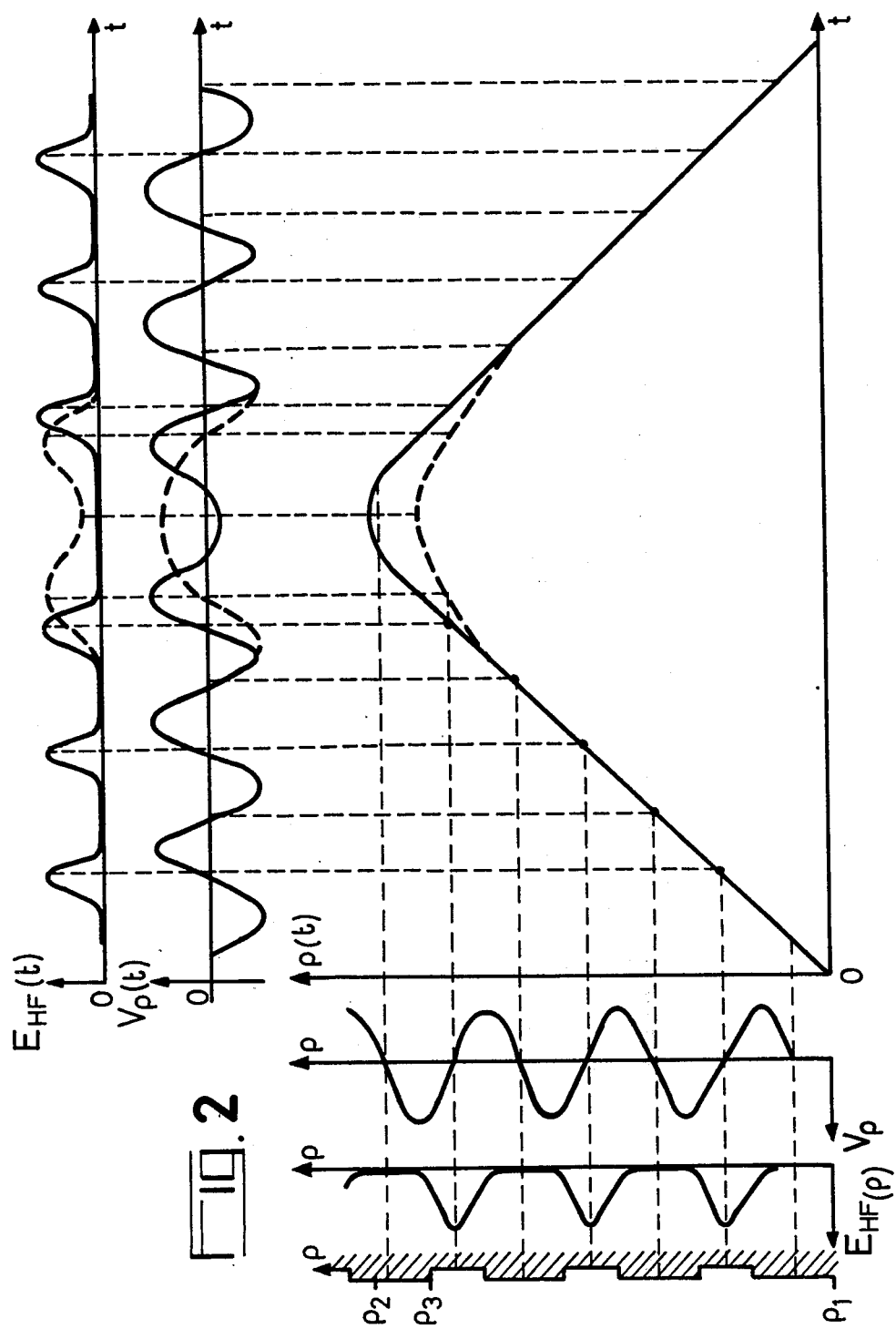
Figure 3:
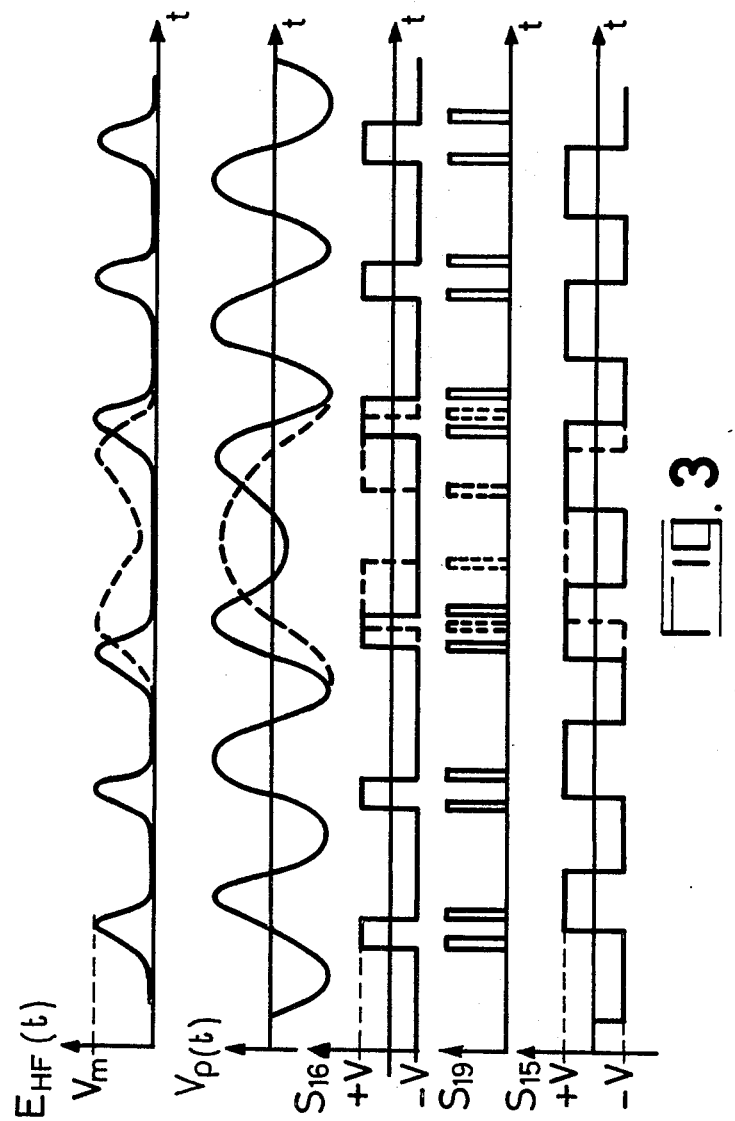
Figure 4:
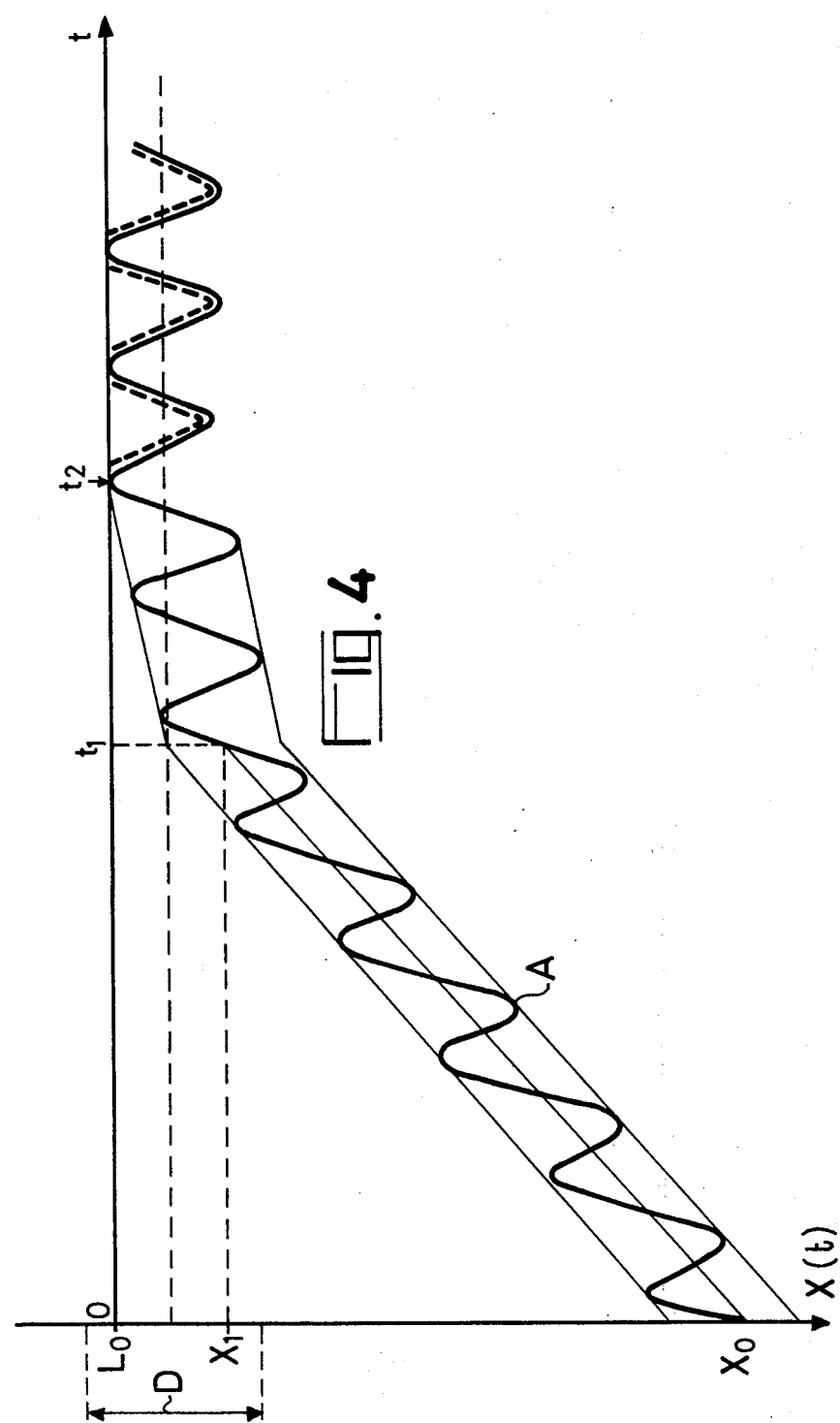

FIGS. 2, 3 and 4 are diagrams of signals illustrating the mode of operation of the arrangement.

When the number of grooves traversed is counted solely from the series of high-frequency waves detected, it is not possible to differentiate between the two directions of the relative movement of the optical reading head and the information-carrying disc. When a fault appears in the centring of the disc, it gives rise to an error in the number of grooves counted which cannot be corrected unless another parameter is taken into consideration.

Now, there exists a signal which is not symmetrical on either side of the axis of the track and which may therefore be used for determining the direction of the relative radial movement of the reading head and the disc. This signal is the radial error signal. Normally this radial error signal changes sign when the reading head passes through the vertical of a track and shows whether the reading head is situated to the right or to the left of the axis of the track.

The optical reader according to the invention comprises counting means for counting the tracks, the counting means simultaneously uses the envelope of the HF signal and the radial error signal $V\rho$ for algebraically counting the number of grooves traversed.

FIG. 1 diagrammatically illustrates the optical disc reader, equipped with means for automatic access to the information, according to the invention.

It comprises a laser reading source 1 emitting a reading beam 2. This beam is directed towards a return mirror 3 which is capable of oscillating about a mean position under the control of an alternating signal supplied by the generator 30. The wobbling of this mirror is used for obtained a radial error signal, as described hereinafter. The reading beam reflected by the mirror 3 is received by a mirror 4 after having passed through a partially reflective plate 5. This mirror is used for keeping the reading spot on the track when the radial servocontrol loop of the system is closed. The beam reflected by the mirror 4 is focussed onto the surface of the information carrier disc 7 (partially shown) by means of a lens 6. In the FIG., it has been assumed that the carrier is readable by reflection, although this arrangement is by no means exclusive and the disc may also be readable by transmission. The disc 7 is shown partly in section along a radius, the abscissae of the various grooves increasing from the center of the disc towards the periphery along the axis $\rho$.

The beam received by the carrier disc is reflected by the carrier disc and then by the mirror 4 and the plate 5, the light being collected in a detection plane, 8 by detection means. The corresponding electrical signal is amplified by an amplifier 9 which supplies the signal S required for reading the information. For the radial servocontrol, this signal is also filtered in a high-pass filter 10 in order to eliminate the d.c. component. The output signal of the filter 10 is then detected by a detector 11 and the detected signal is mixed in a mixer 12 with the wobbling signal controlling the movement of the mirror 3. The signal issuing from the mixer is characteristic of the radial error $V\rho$ in the position of the reading spot relative to the groove. This signal is then reshaped and amplified in an amplifier 13 before being applied to the mirror 4 for returning the spot to the vertical of a groove when the radial servocontrol loop is closed.

A switch 14 has been shown in this servo-control loop. This switch is open during the phase of automatic access to the information and then closed when the reading spot has reached the required groove, as will be explained hereinafter. The radial error signal $V\rho$ has been shown in FIG. 2 in dependence upon the position of the reading spot along the radius $\rho$ of the disc.

The envelope $E_{HF}(\rho)$ of the high-frequency signal is also shown in FIG. 2 in dependence upon the position of the reading spot on the radius $\rho$ of the disc, together with a curve representing the radial position of the reading spot as a function of time t. This curve corresponds to a movement of the reading spot from the position $\rho_1$ to the position $\rho_2$ and back again. The collected signals $V\rho$ (t) and $E_{HF}$(t), which correspond to this movement, has also been shown.

The simultaneous observation of the radial error ($V\rho$) signal and the envelope of the high frequency signal $E_{HF}$ shows that, when the reading head moves towards the outside of the disc (direction of the increasing radii), the ascending sides of the envelope of the HF signal correspond to negative values of the radial error signal, whereas when the reading head moves towards the interior of the disc (direction of the decreasing radii), the ascending sides of the envelope of the high frequency signal correspond to positive values of the radial error signal.

Accordingly, a first device for algebraically counting the number of grooves traversed may comprise an up-and-down counter, to the clock input of which are applied pulses released by the ascending sides of the envelope of the HF signal, up-counting or down-counting being controlled by the sign of the radial error signal. However, such as device can be improved because, at a zero advance point, i.e. when the reading head and the disc are fixed in relation to one another, several pulses may be released by slight fluctuations in the high-frequency signal which would be incorrectly up-counted or down-counted, depending on whether they appeared in a zone where the radial error is negative or positive.

A finer analysis of the signals $V\rho$ and $E_{HF}$ shows that the ascending sides of the envelope of the high frequency signal when the radial error signal is negative and the descending sides of this same envelope of the high frequency signal when the radial error signal is positive correspond to a movement of the reading head towards the outside of the disc. By contrast, the ascending sides of the envelope of the HF signal when the radial error signal is positive and the descending sides of this same envelope when the radial error signal is negative correspond to a movement of the reading head towards the centre of the disc.

The device for counting the number of grooves traversed avoiding the drawback above mentioned in such that it up-counts the pulses corresponding to the descending sides and down-counts the pulses corresponding to the ascending sides of the envelope of the high frequency signal when the radial error signal is positive and up-counts the pulses corresponding to the ascending sides and down-counts the pulses corresponding to the descending sides when the radial error signal is negative. Thus, the arrival on a groove towards the increasing radii will be counted + 1 and will necessarily be followed either by an exit from the groove towards the increasing radii also counted + 1, the total + 2 corresponding to the traversal of one groove, or by an exit from the groove towards the decreasing radii counted − 1, in which case the total count will be 0; the corresponding groove not having been traversed. Similarly, for down-counting, the arrival on a groove towards the decreasing radii counter − 1 will necessarily be followed either by an exit from the groove towards the decreasing radii counter − 1, the total − 2 corresponding to the traversal of one groove, or by an exit from the groove towards the increasing radii counter + 1, in which case the total count will be 0, signifying that the groove has not been traversed.

The corresponding device comprises a first comparison circuit 15 to the "+" input of which the radial error $V\rho$ (t) signal is applied, the "−" input being at earth potential. The output signal, $S_{15}$, of this amplifier is shown as a function of time in FIG. 3. It passes through 0 at the same time as $V\rho$, i.e. when the reading head passes through the vertical of the axis of a track and has a value + V or − V, depending on whether the radial error is positive or negative. The device further comprises a second comparison circuit 16 receiving the envelope signal $E_{HF}$(t) and a constant signal having the value Vm/2, which supplies a signal $S_{16}$, also shown in FIG. 3, of value + V or − V, depending on whether the envelope signal $E_{HF}$(t) has a value above or below Vm/2, Vm being the maximum value of $E_{HF}$. This signal is applied to the inputs of two monostables circuits 17 and 18 which are respectively released by the ascending and descending sides of the signal $S_{16}$. The outputs of these two monostable circuits are connected to the inputs of an OR-gate 19 which thus supplies a train of pulses corresponding to the passages through Vm/2 of the envelope signal $E_{HF}$, i.e. to the arrivals on the grooves or to the exits from the grooves.

FIGS. 2 and 3 also show in dotted lines a movement from the position $\rho_1$ to the position $\rho_3$ and back again, together with the corresponding signals.

The output signal $S_{19}$ of the OR-gate 19 is applied to the clock input of an up-and-down counter 20 which also has an up-and-down counting input so that, if the signal applied to up-and-down counting input is positive, the pulses applied the clock input increase the content of the counter and, if this same signal is zero, the pulses apply to the clock input reduce the content of the counter. The signal applied to this up-and-down counting input is the output signal of an exclusive OR-gate 21 which receives at its input the output signals of the respective comparison circuits 15 and 16.

Thus, the counter has a content which is always double the number of tracks actually traversed. A divider by two 22 reestablishes the exact number of grooves traversed.

A logic comparator 23 receives at one input the algebraic value corresponding to the number of grooves to be traversed for reaching the groove containing the information to which access is desired from a register 24 in which this value has been recorded and, at its second multiple input, receives the content of the divider 22. It successively supplies one and the other of the two control signals $S_1$ or $S_2$ when the difference between the content of the divider by two and the recorded number is equal to a predetermined number N, for example 1000, and when this difference is zero. This number N is the number of grooves which will be necessarily traversed during the deceleration phase of the reading head after stoppage of the rapid radial advance control. The direction of the rapid advance is determined beforehand from the sign of the difference between an address read before any movement of the disc in relation to the head and the recorded address $a_o$ of the required item of information. When the content of the comparator 23 reaches the value N, the signal $S_1$ controlling deceleration is emitted and, when the content of this comparator is zero, the signal $S_2$ is emitted. This signal $S_2$ simultaneously controls the complete stoppage of the reading head and the closure of the radial servocontrol loop by closing the switch 14 so as to keep the reading spot on the groove thus reached.

The device described above is applicable to the location of information on information carrying discs where the track is formed by concentric grooves. This is because, when the device is in operation, the reading head is normally stopped on a groove and the rotation of the disc does not result in any additional modification to the position of the reading head relative to the disc.

When the track is in the form of a spiral and when the disc is rotating, a normal radial advance mechanism enables the the rack to be followed. Accordingly, for every revolution completed by the rotating disc, the reading head advances by one groove in the normal direction, i.e. towards the centre of the disc, without traversing the groove in question. The content of the up-and-down counter will therefore show a deficit or a surplus, depending upon the direction of the rapid radial advance superimposed upon the normal radial advance. For automatic access to the information contained in discs of this type, the optical reader additionally comprises means for taking this error into consideration.

To this end, an up-and-down counting input has been shown in dotted lines in FIG. 1 for the register 24. This input receives pulses I at the frequency of rotation of the disc. Taking into account the direction selected for the axis $\rho$, there pulses have to increase the algebraic value of the register because, for a movement towards the decreasing radii, the number of grooves to be counted is smaller than the number initially calculated and the corresponding algebraic value is negative whilst, for a movement towards the increasing radii, the number of grooves to be counted is larger than the number initially calculated and the corresponding algebraic value is positive.

The up-and-down counting and comparison functions may be performed by one and the same up-and-down counter. In this case, this counter is initially loaded with a value double the algebraic value corresponding to the number of grooves to be traversed, the pulses corresponding to the track traversals producing a reduction in the absolute value of the content of the counter. The shape of the track, when it is in the form of a spiral, is taken into consideration by an increase, at a frequency double the frequency of rotation of the disc, in the algebraic value of the content of the up-and-down counter. The signal $S_1$ is thus emitted when the content of the up-and-down counter has an absolute value equal to 2N, whilst the signal $S_2$ is emitted when this content is zero.

If no additional precautions are taken, it could be difficult in certain cases to keep the reading spot within the dynamic range of the radial servocontrol system on account of the eccentricity of the disc which can reach a level equivalent to about a hundred tracks. Accordingly, the device additionally comprises means for centring the dynamic range D of the radial servocontrol system in relation to the displacements due to the eccentricity of the disc.

FIG. 4 shows a curve representing the relative distance between the axis of the required groove A and the reading lead Lo as a function of time. This distance X varies on the one hand alternately due to the eccentricity of the disc and, on the other hand, linearly during the radial advance; X (t) is therefore the result of superimposing the alternate movement and the linear movement.

The distance $X_0$ corresponds to the difference between the initially read address of the reading head and the address of the required groove. It has been assumed that this difference is greater than N so that a rapid advance is ordered. This advance continues until the distance $X_1$ between the axis of the track A and the head Lo corresponds to the space occupied by N grooves. At this instant $t_1$, the deceleration phase commences and lasts until the content of the comparator 23 is zero, i.e. until the instant $t_2$. Since at this instant the advance is slow, the required groove is encountered in the vicinity of an extremum of the eccentricity, i.e. at a moment when the relative head-groove speed is very low. The radial servocontrol loop may therefore be closed and the head will follow the groove, providing of course that the variation in distance does not take the groove outside the dynamic range of the servocontrol system.

To this end, a d.c. voltage v is applied for controlling the mirror 4 in addition to the radial error signal so that the spot is set back from the mean position. The positional error imparted to the spot is compensated by a corresponding mechanical displacement of the optical bench so that the spot is in the same position.

Accordingly, the location of the groove is carried out as follows:

1. Calculation of the difference between the address of the required groove and the address of the groove read before any radial movement of the head (or disc) and loading of the difference into a comparator (or directly into the up-and-down counter after multiplication by two).

2. Opening of the radial servocontrol loop and displacement of the spot in the dynamic range of the radial servocontrol mechanism.

3. Starting of the radial advance motor in the direction determined by the sign of the difference calculated in the first phase and up/down counting of the tracks traversed.

4. Deceleration of the motor when the up-and-down counter approaches zero (for example 1000, providing for a deceleration zone of the travelling carriage equal to 1000 intergrooves, i.e. 1.6 mm in one embodiment of the discs).

5. Complete stoppage of the motor and closure of the radial servocontrol loop when the content of the up and down counter is equal to zero.

6. Verification of the adress of the groove and exact location by step-by-step jumps.

An arrangement such as this enables the leading head to arrive on the required groove with a high degree of probability, the residual errors being due for example to punctiform defects such as dust.

For the rapid advance, it is possible to move either the disc by moving a carriage integral therewith, in which case the reading head is fixed, or the optical bench, in which case the disc remains fixed.

In addition, the signals $V_P$ and $E_{HF}$ used for location may be obtained by any known reading device, the disc reader operating either by transmission or by reflection.

Finally, the content of the up-and-down counter may be converted by a digital-analog converter for supplying a variable control signal to the motor controlling the radial advance. The speed of the motor is thus rendered variable in dependence upon the distance to be travelled. The present invention also relates to devices comprising logic circuits enabling the same result to be obtained.

The invention is applicable to the location of images stored on video discs or to the location of stored binary information, in which case the discs act as memories for data-processing applications, or to the location of any other type of stored information.

What we claim is:

1. An optical reader for information discs, said discs being recorded along a track with information locatable by their addresses recorded on successive grooves of the track, said optical reader comprising a radiation source, a reading head for projecting on said disc an optical reading spot, detecting means for detecting the radiation emerging from said disc and delivering a reading signal and an error signal characteristic of amplitude and direction of the radial difference between the position of the reading spot and the position of the nearest groove of said track from said spot, means for automatic access to the information, said means comprising a radial advance mechanism to control relative radial movement of the optical reading head and the disc, an up-and-down counting device for counting the grooves traversed during said radial movement, said counting device receving simultaneously said reading signal and said radial error signal, and a comparison circuit receiving the content of said up-and-down counting device and a predetermined value corresponding to the position of the required information, said comparison circuit being connected to said radial advance mechanism and delivering a control signal to control actuating and stopping of said advance mechanism.

2. An optical reader as claimed in claim 1 further comprising a radial servocontrol loop to keep said reading spot on said track, switching means located in said loop controlled by said control signal, to open said loop when said radial advance mechanism is actuated and to close said loop when said advance mechanism is stopped.

3. An optical reader as claimed in claim 2, wherein said control signal supplied by said comparison circuit initiates a deceleration phase when the number of grooves traversed differs by a predetermined number N from said predetermined value, said value being the difference between the address of said required groove and an address initially detected.

4. An optical disc reader as claimed in claim 1, wherein said comparison circuit is included in the up-and-down counter, said up-and-down counter being loaded with said difference and down counting the number of grooves traversed, the signal controlling deceleration being emitted when the content of the up-and-down counter is equal to N and the signal controlling stoppage being emitted when the content of the up-and-down counter is equal to zero.

5. An optical disc reader as claimed in claim 1, wherein said counting device comprises a circuit for shaping the radial error signal which supplies a signal having one or the other of two states depending on the sign of said radial error, a circuit for detecting the reading signal supplying a maximum envelope signal when the reading spot is at the centre of a groove, a logic circuit receiving the envelope signal and supplying a pulse for each of the ascending and descending sides of the envelope signal, said up-and-down counter receiving the pulses at its clock input and the two-state signal as its up-and-down counting input for up-counting and down-counting the pulses according to the state of the two-state signal.

6. An optical disc reader as claimed in claim 5, wherein said reading spot is displaced from its mean position in such a way that the dynamic range of the radial servocontrol system is centred in relation to oscillations due to eccentricity of the disc at the moment of closure of the radial servocontrol loop.

7. An optical disc reader as claimed in any of claims 1 through 6, wherein during an automatic access phase the reader operates in accordance with the following steps:
    calculation of the difference between the adress of the required groove and the address of the groove read before any movement and loading of the difference into the up-and-down counting circuit;
    opening of the radial servocontrol loop and displacement of the dynamic range of the radial servocontrol system in relation to the projected reading spot;
    release of the rapid radial advance and counting of the tracks traversed;
    deceleration of the radial advance when the up-and-down counter approaches zero;
    complete stoppage of the motor and closure of the radial servocontrol loop when the contact of the up-and-down counter is equal to zero;
    verification of the address of the groove and exact location by step-by step jumps.

* * * * *